US011190627B2

(12) United States Patent
Heuberger et al.

(10) Patent No.: US 11,190,627 B2
(45) Date of Patent: Nov. 30, 2021

(54) TELEGRAM SPLITTING FOR SLOTTED ALOHA

(71) Applicants: Fraunhofer-Gesellschaft zur Förderung der angewandten Forschung e.V., Munich (DE); Friedrich-Alexander-Universität Erlangen-Nürnberg, Erlangen (DE)

(72) Inventors: Albert Heuberger, Erlangen (DE); Marco Breiling, Erlangen (DE); Jörg Robert, Uttenreuth (DE); Jakob Kneissl, Fürth (DE); Gerd Kilian, Erlangen (DE); Josef Bernhard, Nabburg (DE); Johannes Wechsler, Spalt (DE); Stefan Ereth, Fürth (DE)

(73) Assignees: Fraunhofer-Gesellschaft zur Förderung der angewandten Forschung e.V., Munich (DE); Friedrich-Alexander-Universität Erlangen-Nürnberg ', Erlangen (DE)

( * ) Notice: Subject to any disclaimer, the term of this patent is extended or adjusted under 35 U.S.C. 154(b) by 0 days.

(21) Appl. No.: 16/132,100

(22) Filed: Sep. 14, 2018

(65) Prior Publication Data

US 2019/0014198 A1    Jan. 10, 2019

Related U.S. Application Data

(63) Continuation of application No. PCT/EP2017/056013, filed on Mar. 14, 2017.

(30) Foreign Application Priority Data

Mar. 15, 2016 (EP) .................................. 16160485

(51) Int. Cl.
*H04L 29/08* (2006.01)
*H04W 52/02* (2009.01)
(Continued)

(52) U.S. Cl.
CPC ............ *H04L 69/324* (2013.01); *H04L 47/36* (2013.01); *H04L 67/12* (2013.01);
(Continued)

(58) Field of Classification Search
CPC ...... H04L 47/36; H04L 69/166; H04W 28/06; H04W 28/065
See application file for complete search history.

(56) References Cited

U.S. PATENT DOCUMENTS

| 7,409,094 B2 * | 8/2008 | Wee ........................ H04L 29/06 |
| | | 348/E7.055 |
| 8,553,824 B2 * | 10/2013 | Dai ........................ H04J 3/0605 |
| | | 375/354 |

(Continued)

FOREIGN PATENT DOCUMENTS

| AU | 2009215558 A1 * | 8/2009 | ............ H04J 3/0605 |
| CA | 2717591 A1 * | 8/2009 | ............ H04J 3/0605 |

(Continued)

OTHER PUBLICATIONS

Killian et al., Increasing Transmission Reliability for Telemetry Systems Using Telegram Splitting, Dec. 30, 2014, IEEE Transactions on Communications, vol. 3, No. 3, Mar. 2015 (Year: 2014).*
(Continued)

*Primary Examiner* — Eric Nowlin
(74) *Attorney, Agent, or Firm* — Michael A. Glenn; Perkins Coie LLP

(57) ABSTRACT

A transmitter is configured to operate in a mobile communication system according to a mobile communication standard (e.g., 3GPP), wherein resources of the communication system are divided into resources elements. The transmitter is also configured to transmit an additional telegram by separating the telegram into a plurality of data packets, each of the data packets being shorter than the telegram, and
(Continued)

transmitting each of the data packets respectively in one of the resource elements.

18 Claims, 6 Drawing Sheets

(51) Int. Cl.
    *H04W 28/02*           (2009.01)
    *H04L 12/805*         (2013.01)
    *H04L 12/911*         (2013.01)

(52) U.S. Cl.
    CPC ... *H04W 28/0284* (2013.01); *H04W 52/0258* (2013.01); *H04L 47/826* (2013.01); *Y02D 30/70* (2020.08)

(56) References Cited

U.S. PATENT DOCUMENTS

| | | | | |
|---|---|---|---|---|
| 8,588,124 | B2 * | 11/2013 | Jo | H04W 74/006 370/312 |
| 8,855,090 | B2 * | 10/2014 | Noh | H04W 28/06 370/338 |
| 9,354,081 | B2 * | 5/2016 | Bernhard | G01D 4/002 |
| 9,356,879 | B2 * | 5/2016 | Sundar | H04L 47/365 |
| 9,585,111 | B2 * | 2/2017 | Dai | H04J 3/0605 |
| 9,743,400 | B2 * | 8/2017 | Zhang | H04B 7/2643 |
| 9,923,835 | B1 * | 3/2018 | Singh | H04L 47/365 |
| 9,948,568 | B2 * | 4/2018 | Tsirkin | H04L 47/36 |
| 10,291,527 | B2 * | 5/2019 | Menase | H04L 69/166 |
| 10,477,372 | B2 * | 11/2019 | Ray | H04W 80/02 |
| 2005/0053066 | A1 * | 3/2005 | Famolari | H04L 12/6418 370/389 |
| 2005/0084132 | A1 * | 4/2005 | Wee | H04N 19/37 382/100 |
| 2006/0013258 | A1 * | 1/2006 | Banerjee | H04L 49/3072 370/474 |
| 2009/0207954 | A1 * | 8/2009 | Dai | H04J 3/0605 375/345 |
| 2010/0180171 | A1 * | 7/2010 | Liu | H04L 69/324 714/748 |
| 2010/0322249 | A1 * | 12/2010 | Thathapudi | H04L 47/10 370/395.1 |
| 2011/0268012 | A1 * | 11/2011 | Jo | H04W 74/006 370/312 |
| 2012/0011224 | A1 * | 1/2012 | Casey | H04N 21/4363 709/219 |
| 2012/0163362 | A1 * | 6/2012 | Noh | H04W 28/06 370/338 |
| 2013/0003544 | A1 * | 1/2013 | Wermuth | H04L 47/56 370/230 |
| 2013/0100805 | A1 | 4/2013 | Heine et al. | |
| 2013/0128876 | A1 * | 5/2013 | Kilian | H03M 13/6306 370/347 |
| 2013/0222118 | A1 * | 8/2013 | Felemban | G06K 7/10039 340/10.2 |
| 2013/0301420 | A1 | 11/2013 | Zhang et al. | |
| 2014/0016626 | A1 * | 1/2014 | Dai | H04J 3/0605 370/336 |
| 2014/0092828 | A1 | 4/2014 | Sirotkin | |
| 2014/0176341 | A1 * | 6/2014 | Bernhard | G01D 4/002 340/870.02 |
| 2014/0321423 | A1 | 10/2014 | Kalhan | |
| 2015/0078243 | A1 * | 3/2015 | Zhang | H04B 7/2643 370/312 |
| 2015/0098469 | A1 * | 4/2015 | Chudgar | H04L 47/41 370/392 |
| 2015/0271841 | A1 | 9/2015 | Yamada et al. | |
| 2015/0289292 | A1 | 10/2015 | Sun et al. | |
| 2015/0341278 | A1 * | 11/2015 | Sundar | H04L 47/365 370/392 |
| 2015/0349927 | A1 * | 12/2015 | Cohn | H04L 1/0083 714/748 |
| 2016/0249328 | A1 * | 8/2016 | Bernhard | G01D 4/002 |
| 2017/0034067 | A1 * | 2/2017 | Schrum, Jr. | H04L 1/188 |
| 2017/0093736 | A1 * | 3/2017 | Tsirkin | H04L 47/36 |
| 2017/0366926 | A1 * | 12/2017 | Ray | H04L 69/22 |
| 2018/0191872 | A1 * | 7/2018 | Sarikaya | H04L 61/2596 |
| 2018/0262951 | A1 * | 9/2018 | Jiang | H04W 28/065 |
| 2019/0036833 | A1 * | 1/2019 | Bernhard | H04L 1/0041 |
| 2019/0036834 | A1 * | 1/2019 | Bernhard | H04L 1/0041 |
| 2019/0116617 | A1 * | 4/2019 | Howard | H04W 74/0816 |
| 2019/0227158 | A1 * | 7/2019 | Kilian | H04L 5/001 |
| 2019/0246315 | A1 * | 8/2019 | Kilian | H04L 1/0007 |
| 2019/0313225 | A1 * | 10/2019 | Gitlin | H04L 12/66 |

FOREIGN PATENT DOCUMENTS

| | | | | | |
|---|---|---|---|---|---|
| CA | 2942545 | A1 | * | 8/2009 | ............ H04J 3/0605 |
| CA | 2717591 | C | * | 11/2016 | ............ H04J 3/0605 |
| CA | 2942545 | C | * | 5/2017 | ............ H04J 3/0605 |
| CA | 3018641 | A1 | * | 9/2017 | ............ H04L 1/0041 |
| DE | 102011082098 | A1 | | 3/2013 | |
| EP | 2245772 | A1 | * | 11/2010 | ............ H04J 3/0605 |
| EP | 2938142 | A1 | | 10/2015 | |
| EP | 2245772 | A4 | * | 6/2016 | ............ H04J 3/0605 |
| EP | 3433960 | A1 | * | 1/2019 | ............ H04L 1/0041 |
| EP | 3433961 | A2 | * | 1/2019 | ............ H04L 1/0041 |
| EP | 2245772 | B1 | * | 4/2019 | ............ H04J 3/0605 |
| EP | 3519851 | A1 | * | 8/2019 | ............ G01S 13/84 |
| JP | 2015521425 | A | | 7/2015 | |
| KR | 20060050458 | A | | 5/2006 | |
| KR | 20110025559 | A | * | 3/2011 | .......... H04W 74/006 |
| KR | 20130126980 | A | | 11/2013 | |
| KR | 20150115685 | A | | 10/2015 | |
| RU | 2546552 | C2 | | 4/2015 | |
| WO | WO-2009105524 | A1 | * | 8/2009 | ............ H04J 3/0605 |
| WO | WO-2010079952 | A2 | * | 7/2010 | .......... H04W 74/006 |
| WO | WO-2010079952 | A3 | * | 10/2010 | .......... H04W 74/006 |
| WO | WO-2011154051 | A1 | * | 12/2011 | ............ H04W 88/16 |
| WO | WO-2017162742 | A2 | * | 9/2017 | ............ H04L 1/0041 |
| WO | WO-2017162742 | A3 | * | 11/2017 | ............ H04L 1/0041 |
| WO | WO-2018165599 | A1 | * | 9/2018 | ............ H04L 1/0007 |
| WO | WO-2018165599 | A8 | * | 10/2018 | ............ H04L 1/0007 |
| WO | WO-2019079247 | A1 | * | 4/2019 | ............ H04B 17/318 |

OTHER PUBLICATIONS

Kilian et al., Improved Coverage for Low-Power Telemetry Systems using Telegram Splitting, Jun. 12, 2013, Smart SysTech 2013; European Conference on Smart Objects,Systems and Technologies, VDE, ISBN: 978-3-8007-3521-1 (Year: 2013).*

Kilian, G et al., "Improved Coverage for Low-Power Telemetry Systems using Telegram Splitting", Proceedings of 2013 European Conference on Smart Objects, Systems, and Technologies (SmartSysTech), 2013, 6 pages.

Massey, James L. et al., "The Collision Channel Without Feedback", Information Theory, IEEE Transactions, 1985, pp. 192-204.

* cited by examiner

TELEGRAM SPLITTING FOR SLOTTED ALOHA

CROSS-REFERENCE TO RELATED APPLICATIONS

This application is a continuation of copending International Application No. PCT/EP2017/056013, filed Mar. 14, 2017, which is incorporated herein by reference in its entirety, and additionally claims priority from European Application No. EP 16160485.5, filed Mar. 15, 2016, which is incorporated herein by reference in its entirety.

Embodiments relate to a transmitter, and specifically, to a transmitter using telegram splitting for transmitting an additional telegram in a communication system that is configured to operate according to a communication standard, such as 3GPP. Further embodiments relate to a receiver for receiving such an additional telegram.

BACKGROUND OF THE INVENTION

The area of machine to machine (M2M) communication leads to new challenges for the 3GPP (3rd Generation Partnership Project, a collaboration between groups of telecommunications associations) standard family. These challenges are currently not solved optimally using the current 3GPP standards, as they are focusing on high data-rates with high amounts of data. In contrast, M2M typically does not require these high data rates, and the amount of data is typically just few bytes per device. On the other hand, the number of devices in case of M2M is expected to be significantly higher compared to today's use of 3GPP networks. As a consequence, the overhead of current 3GPP systems for M2M communication that may be used for the signalling is extremely high, leading to power and spectrally in-efficient systems.

DE 10 2011 082 098 A1 shows a battery operated stationary sensor arrangement with unidirectional data transmission using telegram splitting.

SUMMARY

One embodiment may have a transmitter, configured to operate in a mobile communication system according to a mobile communication standard, wherein resources of the communication system are divided into resources elements; wherein the transmitter is configured to transmit an additional telegram additional to a standard compliant telegram by separating the telegram into a plurality of data packets, each of the data packets being shorter than the telegram, and transmitting each of the data packets respectively in one of the resource elements; wherein the transmitter is configured to transmit the plurality of data packets of the additional telegram in resource elements reserved for non-standard compliant communication; wherein the transmitter is configured to select the resource elements for transmitting the data packets out of the resource elements reserved for non-standard compliant communication, and to start transmission of the data packets in the selected resource elements without prior listening whether these resource elements are free.

Another embodiment may have a receiver, configured to operate in a mobile communication system according to a mobile communication standard, wherein resources of the communication system are divided into resources elements; wherein the receiver is configured to receive an additional telegram additional to a standard compliant telegram which is transmitted separated into a plurality of data packets, each of the data packets being shorter than the telegram, by receiving each of the data packets respectively in one of the resource elements; wherein the receiver is configured to receive the data packets of the additional telegram in resource elements reserved for non-standard compliant communication; wherein the receiver is configured to receive the data packets in resource elements selected by a transmitter out of the resource elements reserved for non-standard compliant communication.

According to another embodiment, a system may have: an inventive transmitter; and an inventive receiver.

According to another embodiment, a method for transmitting in a mobile communication system according to a mobile communication standard, wherein resources of the communication system are divided into resources elements, may have the steps of: transmitting an additional telegram additional to a standard compliant telegram by separating the additional telegram into a plurality of data packets, each of the data packets being shorter than the telegram, and by transmitting each of the data packets respectively in one of the resource elements; wherein transmitting includes transmitting the plurality of data packets of the additional telegram in resource elements reserved for non-standard compliant communication; wherein transmitting includes selecting the resource elements for transmitting the data packets out of the resource elements reserved for non-standard compliant communication; and wherein transmitting includes starting transmission of the data packets in the selected resource elements without prior listening whether these resource elements are free.

According to another embodiment, a method for receiving in a mobile communication system according to a mobile communication standard, wherein resources of the communication system are divided into resources elements, may have the steps of: receiving an additional telegram additional to a standard compliant telegram, wherein the additional telegram is transmitted separated into a plurality of data packets, each of the data packets being shorter than the telegram, by receiving each of the data packets respectively in one of the resource elements; wherein receiving includes receiving the data packets of the additional telegram in resource elements reserved for non-standard compliant communication; wherein the receiving includes receiving the data packets in resource elements selected by a transmitter out of the resource elements reserved for non-standard compliant communication.

According to another embodiment, a non-transitory digital storage medium may have a computer program stored thereon to perform the inventive methods, when said computer program is run by a computer.

Embodiments provide a transmitter, configured to operate in a mobile communication system according to a mobile communication standard (e.g., 3GPP), wherein resources of the communication system are divided into resources elements. The transmitter is configured to transmit an additional telegram by separating the telegram into a plurality of data packets, each of the data packets being shorter than the telegram, and transmitting each of the data packets respectively in one of the resource elements.

It is the idea of the present invention to use some of the resource elements of the communication system, e.g., resource elements reserved for non-standard compliant communication, for transmitting an additional telegram by separating the telegram into a plurality of data packets (e.g., at least two data packets), wherein each of the plurality of data packets is shorter than the telegram, and to transmit the plurality of data packets in one of the resource elements, respectively.

Further embodiments provide receiver configured to operate in a mobile communication system according to a mobile communication standard (e.g., 3GPP), wherein resources of the communication system are divided into resources elements. The receiver is configured to receive an additional telegram which is transmitted separated into a plurality of data packets, each of the data packets being shorter than the telegram, by receiving each of the data packets respectively in one of the resource elements reserved for non-standard compliant communication Further embodiments provide a method for transmitting in a mobile communication system according to a mobile communication standard, wherein resources of the communication system are divided into resources elements, wherein the method comprises:

transmitting an additional telegram by separating the telegram into a plurality of data packets, each of the data packets being shorter than the telegram, and by transmitting each of the data packets respectively in one of the resource elements.

Further embodiments provide a method for receiving in a mobile communication system according to a mobile communication standard, wherein resources of the communication system are divided into resources elements, wherein the method comprises:

receiving an additional telegram which is transmitted separated into a plurality of data packets, each of the data packets being shorter than the telegram, by receiving each of the data packets respectively in one of the resource elements.

Advantageous implementations are addressed by the dependent claims.

In embodiments, the transmitter can be configured to transmit the plurality of data packets of the additional telegram in resource elements reserved for non-standard compliant communication. Some of the resource elements can be reserved or allocated (e.g., by a base station of the mobile communication system) for non-standard compliant communication. Similarly, some of the resource elements can be served of allocated for standard compliant communication. The transmitter can be configured to not transmit the plurality of data packets of the additional telegram in the resource elements reserved for standard compliant communication.

In embodiments, the transmitter can be configured to perform standard compliant communication using resource elements reserved for standard compliant communication. For example, the transmitter can be configured to transmit standard compliant data packets (i.e., data packets according to the mobile communication standard) in the resource elements that are reserved or allocated (e.g., by a base station of the mobile communication system) for standard compliant communication.

In some embodiments, some of the resource elements can be allocated for both non-standard compliant communication and standard compliant communication.

In embodiments, the transmitter can be configured to synchronize itself to a synchronization signal of the mobile communication system or another communication system. For example, a base station of the mobile communication system may transmit such a synchronization signal. The transmitter can be also configured to use payload data, e.g., one or more data packets, transmitted by the base station as synchronization signal to which the transmitters synchronizes itself. Naturally, the transmitter can also use signals transmitted by mobile devices as synchronization signal. In addition, also signals of other communication systems can be used as synchronization signal.

In embodiments, the resource elements reserved for non-standard compliant communication can be a proper subset of uplink resource elements used for communication from mobile stations to base stations of the mobile communication system. In other words, some of the resource elements of the mobile communication system can be uplink resource elements, i.e. resource elements allocated or reserved for transmitting data from mobile stations to base station or base stations of the mobile communication system, wherein some of the uplink resource elements are allocated or reserved for the non-standard compliant communication. Other resource elements of the mobile communication system can be downlink resource elements, i.e. resource elements allocated or reserved for transmitting data from base station or base stations to mobile stations of the mobile communication system In embodiments, the resource elements can be associated with at least one out of specific time slots and specific frequencies. For example, resource elements can be specific frequencies or frequency bands (frequency division multiple access). Resource elements can be specific time slots (time division multiple access). Naturally, resource elements also can be specific codes (code division multiple access).

In embodiments, the resources elements reserved for non-standard compliant communication can be allocated dynamically by a base station of the mobile communication system in dependence on performance criteria. Performance criteria can be, for example, a number of transmitter (e.g., mobile stations) of the mobile communication system, a number of transmitters communicating in the resource elements reserved for non-standard compliant communication, a number of transmitters communicating in the resource elements reserved for standard compliant communication, a number of mobile stations transmitting in the same resource element, a latency (e.g., overall latency) of the mobile communication system, or a packet loss rate).

In embodiments, the transmitter can be configured to transmit at least one of the plurality of data packets in a guard resource element, e.g. a guard resource band or frequency, or a guard interval or time slot.

In embodiments, the transmitter can be configured to channel encode the plurality of data packets such that only a part of the plurality of data packets may be used for decoding the additional telegram. For example, some of the data packets may collide with other data packets or data transmitted by an interferer. However, due to channel code applied to the plurality of data packets, the additional telegram still can be decoded using the data packets of the plurality of data packets that were correctly transmitted.

In embodiments, the transmitter can be configured to not transmit or to transmit later one of the plurality of data packets if a transmission of the data packet will lead to a collision with another data packet transmitted by another transmitter of the mobile communication system. For example, the transmitter may know which of the resource elements are used by other transmitters for transmitting data packets. Or the transmitter may have collision detection capabilities, i.e., the transmitter can be configured to detect a collision by listening the communication channel before transmitting the one data packet, wherein the transmitter is configured to not transmit the one data packet when it detects a transmission of another transmitter or an interfering signal.

In embodiments, the plurality of data packets can be channel encoded such that only a part of the plurality of data packets may be used for decoding the additional telegram. When one of the channel encoded data packets collides with another data packet in one of the resource elements, the receiver can be configured reconstruct an original version of the collided channel encoded data packet based on the decoded additional telegram and to subtract the original version of the collided channel encoded data packet from the data received in the resource element in order to obtain the other data packet.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
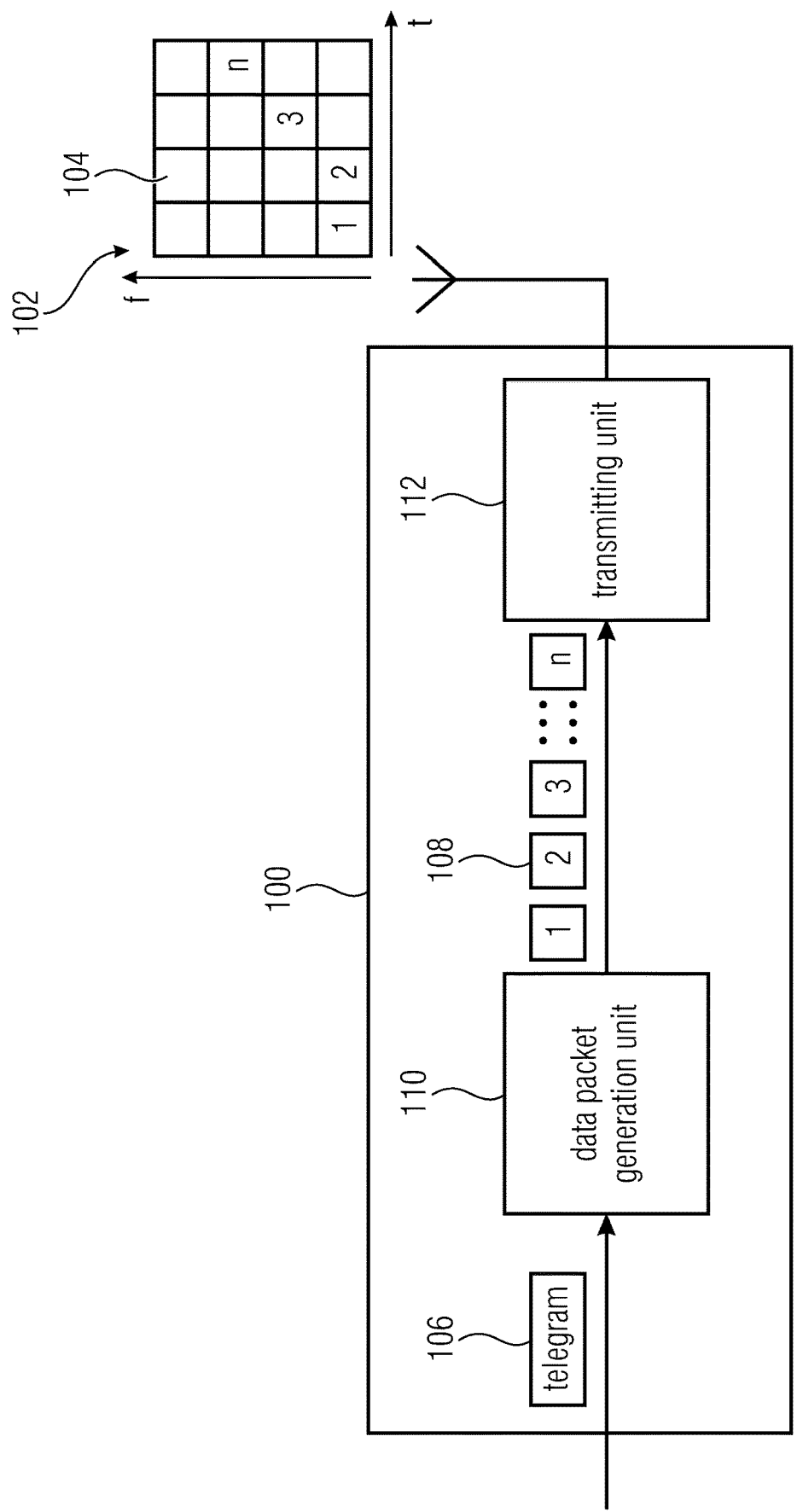
FIG. 1 shows a schematic block diagram of a transmitter, according to an embodiment of the present invention.

Equal or equivalent elements or elements with equal or equivalent functionality are denoted in the following description by equal or equivalent reference numerals.

In the following description, a plurality of details are set forth to provide a more thorough explanation of embodiments of the present invention. However, it will be apparent to one skilled in the art that embodiments of the present invention may be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

FIG. 1 shows a schematic block diagram of a transmitter 100, according to an embodiment of the present invention. The transmitter 100 is configured to operate in a mobile communication system according to a mobile communication standard (e.g., 3GPP). Resource of the mobile communication system can be divided into resource elements (e.g., time slots and/or frequency bands).

Further, FIG. 1 exemplarily shows a resource grid 102 having a plurality of resource elements 104. The resource grid 102 can comprise different frequency bands and/or different time slots. Thus, each of the resource elements of the plurality of resource elements 104 may have a specific frequency band and/or a specific time slot. In FIG. 1, the ordinate describes the frequency and the abscissa the time.

The transmitter 100 can be configured to transmit an additional telegram 106 (e.g., additionally to a standard compliant telegram) by separating the additional telegram 106 into a plurality of data packets 108 (e.g., n data packets, wherein n is natural number greater than or equal to two), each of the data packets 108 being shorter than the telegram 106, and transmitting each of the data packets 108 respectively in one of the resource elements 104.

For example, the transmitter 100 can be configured to transmit a first data packet (of the plurality of data packets) 104 in a first resource element (e.g., a first time slot and/or first frequency band) 104 and to transmit a second data packet (of the plurality of data packets) 108 in a second resource element (e.g., a second time slot following the first time slot, or a second frequency band, different from the first frequency band) 104.

The transmitter 100, for example, can comprise a data packet generation unit 110 and a transmitting unit 112. The data packet generation unit 110 can be configured to separate the additional telegram 106 into the plurality of data packets 108. The transmitting unit 112 can be configured to transmit the plurality of data packets 108 in different resource elements 104.

Separating the additional telegram into the plurality of data packets such that each of the plurality of data packets is shorter than the additional telegram is referred herein as to telegram splitting.

The data packet generation unit 110 and/or the transmitting unit 112 can be implemented in hardware, for example, using a microprocessor, a field programmable gate array or a central processing unit. Furthermore, the data packet generation unit 110 and the transmitting unit 112 can be implemented in the same device.

The transmitter 100 can be, for example, a mobile device of the mobile communication system. Naturally, the transmitter 100 also can be a base station of the mobile communication system. The transmitter 100 can be a transceiver having both transmitting and receiving capabilities.

Figure 2:
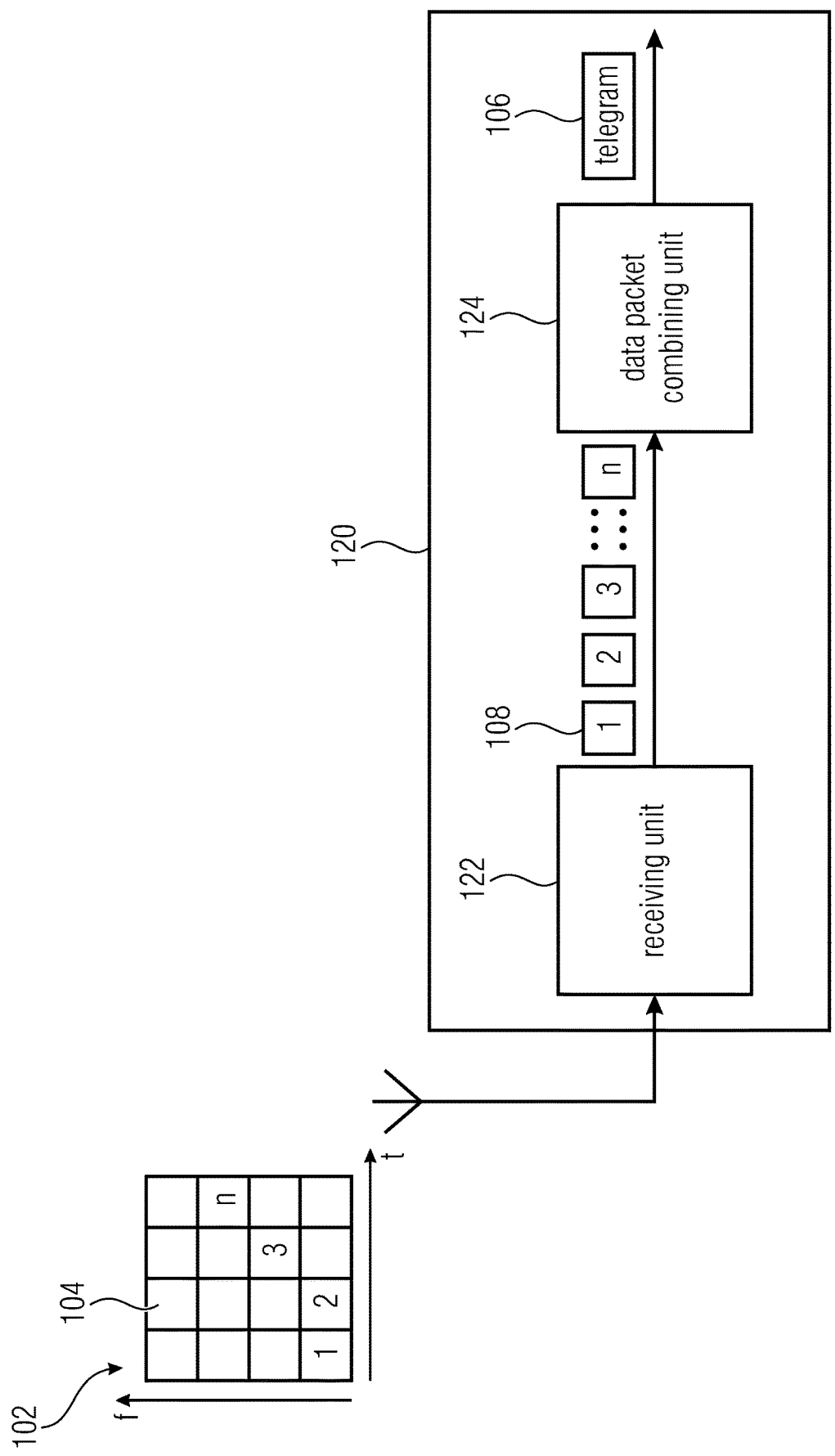
FIG. 2 shows a schematic block diagram of a receiver, according to an embodiment of the present invention.

FIG. 2 shows a schematic block diagram of a receiver 120, according to an embodiment of the present invention. The receiver 120 is configured to operate in a mobile communication system according to a mobile communication standard, (e.g., 3GPP). Resource of the mobile communication system can be divided into resource elements (e.g., time slots and/or frequency bands).

Further, FIG. 2 exemplarily shows a resource grid 102 having a plurality of resource elements 104. The resource grid 102 can comprise different frequency bands and/or different time slots. Thus, each of the resource elements of the plurality of resource elements 104 may have a specific frequency band and/or a specific time slot. In FIG. 1, the ordinate describes the frequency and the abscissa the time.

The receiver 120 is configured to receive an additional telegram 106 (e.g., additionally to a standard compliant telegram) which is transmitted separated into a plurality of data packets 108 (e.g., n data packets, wherein n is a natural number greater than or equal to two), each of the data packets 108 being shorter than the additional telegram 106, by receiving each of the data packets 108 respectively in one of the resource elements 104.

For example, the transmitter 120 can be configured to receive a first data packet (of the plurality of data packets) 104 in a first resource element (e.g., a first time slot and/or first frequency band) 104 and to receive a second data packet (of the plurality of data packets) 108 in a second resource element (e.g., a second time slot following the first time slot, or a second frequency band, different from the first frequency band) 104.

The receiver 120 further can be configured to combine the plurality of data packets 108 in order to obtain the additional telegram.

The receiver 120, for example, can comprise a receiving unit 122 and (optionally) a data packet combining unit 124. The receiving unit 122 can be configured to receive the plurality of data packets 108 in different resource elements 104. The data packet combining unit 124 can be configured to combine the plurality of data packets 108 in order to obtain the additional telegram 106.

data packet generation unit 110 and a transmitting unit 112. The data packet generation unit 110 can be configured to separate the additional telegram 106 into the plurality of data packets 108. The transmitting unit 112 can be configured to transmit the plurality of data packets 108 in different resource elements 104.

The receiving unit 122 and/or the data packet combining unit 124 can be implemented in hardware, for example, using a microprocessor, a field programmable gate array or a central processing unit. Furthermore, the receiving unit 122 and/or the data packet combining unit 124 can be implemented in the same device.

The receiver 120 can be, for example, a base station of the mobile communication system. Naturally, the receiver 120 also can be a mobile device of the mobile communication system. The receiver 120 may be a transceiver having both, receiving and transmitting capabilities.

As mentioned in the introduction of the present patent application, the area machine to machine (M2M) communication leads to new challenges for the 3GPP (3rd Generation Partnership Project, a collaboration between groups of telecommunications associations) standard family.

An interesting approach to improve the performance of future M2M communication systems is the telegram splitting [Kilian, G., et al.; Improved coverage for low-power telemetry systems using telegram splitting, Proceedings of 2013 European Conference on Smart Objects, Systems and Technologies (SmartSysTech), 2013] with Slotted ALOHA. The base station of the network assigns specific time and frequency slots to the devices (e.g., mobile devices) that can simply transmit their data within these slots. All slots typically have the same bandwidth and duration, and some kind of synchronization means may be used for synchronizing the devices with respect to time and frequency so that they are aligned to the slot structure.

If a device wants to transmit data, it just selects one or multiple slots and starts transmission. A prior listening whether specific slots are free is not required. Thus, collisions on the uplink resources may occur. These collisions can be resolved in most cases by means of signal processing (e.g. successive interference cancellation) and specific user sequences (e.g. as proposed by Massey [Massey, J. & Mathys, P.; The collision channel without feedback Information Theory, IEEE Transactions on, 1985, 31, 192-204]). Furthermore, the devices can be fully synchronized to the network, which allows for additional optimization means.

System Structure

Figure 3:
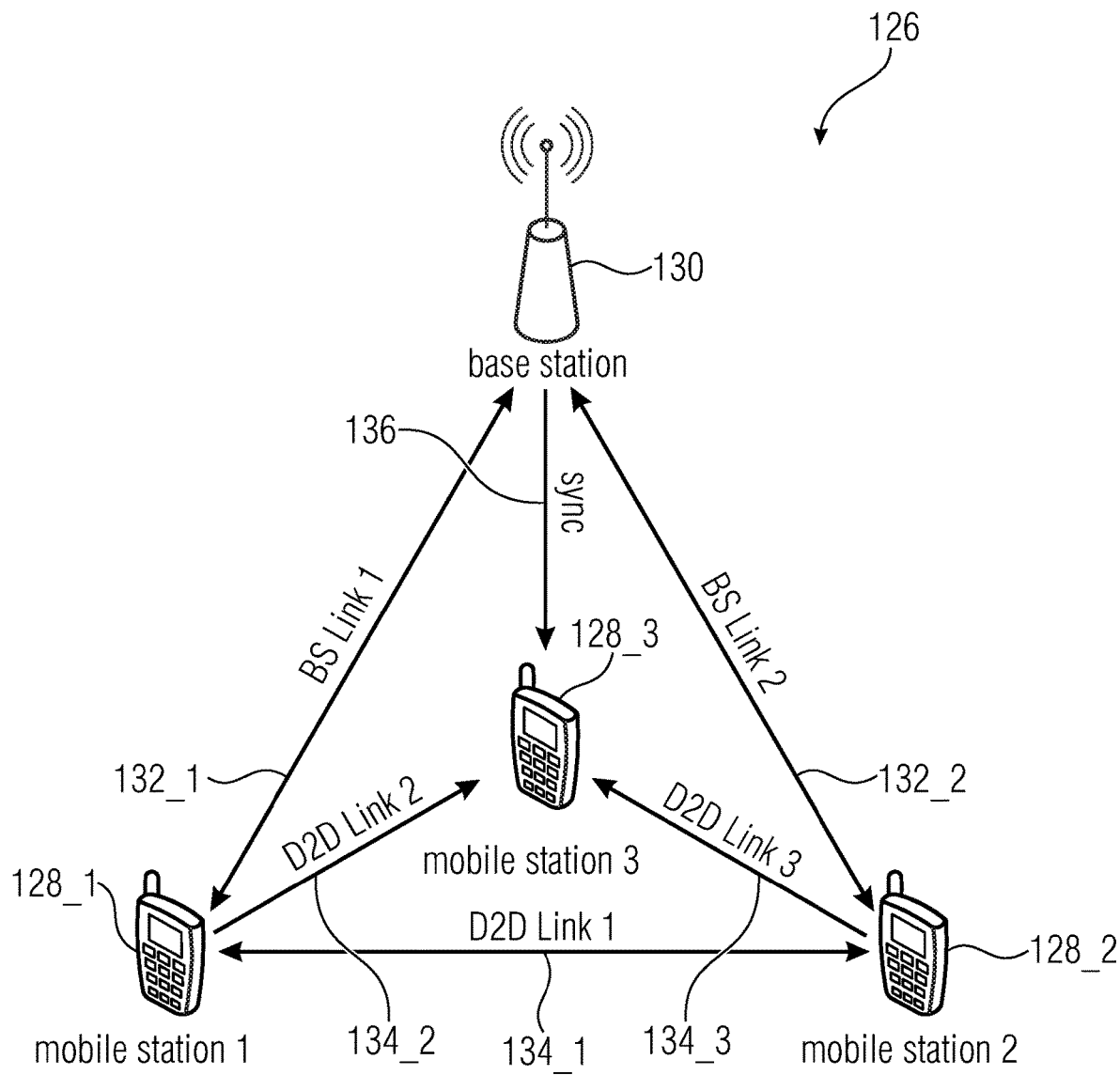
FIG. 3 shows a schematic block diagram of a communication system, according to an embodiment of the present invention.

FIG. 3 shows a schematic block diagram of a mobile communication system 130 comprising three mobile devices 128_1 to 128_3 and a base station 130. Further, in FIG. 3 possible ways of communication are indicated.

In detail, FIG. 3 shows a principle block diagram of the proposed system. "Mobile station 1" 128_1 and "mobile station 2" 128_2 want to communicate with a base station 130 using the links "BS Link 1" 132_1 and "BS Link 2" 132_2, where the focus here is to transmit uplink data to the base station 130. Furthermore, "mobile station 1" 128_1 and "mobile station 2" 128_2 can also communicate directly using the "D2D Link 1" 134_1 and "D2D Link 2" 134_2 (D2D=Device to Device), without using the base station as relay. (In this case the presence of any base station is not required.) However, also in this case the base station 130 may be interested in receiving the data from the D2D Links. Furthermore, also "mobile station 3" 128_3 may be interested to receive data from the "D2D Link 1" 134_1 by means of "D2D Link 2" 134_2 and "D2D Link 3" 134_3. Examples are e.g. car to car (C2C) communication. In this case the "mobile station 3" 128_3 does not have to be connected to the base station 130. However, "mobile station 3" 128_3 has some synchronization information 136, which may be provided by the base station 130 or any other suitable means (see section synchronization).

Thus, the system structure applies to current cellular systems (e.g. 3GPP) or also other transmission schemes, e.g. based on IEEE 802.11 (Wifi) or IEEE 802.15.4 (e.g. ZigBee).

Synchronization

Figure 4:
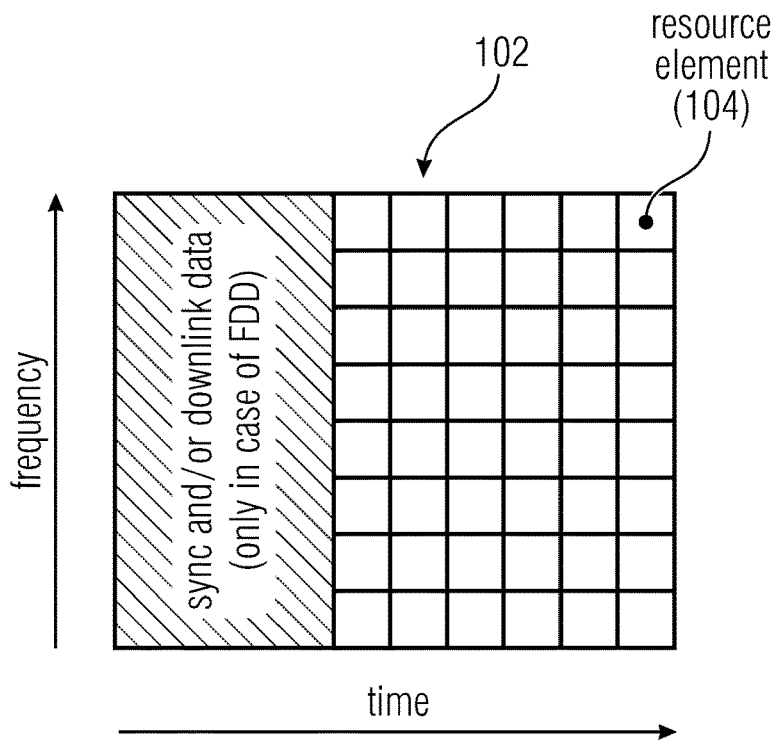
FIG. 4 shows a schematic view of a resource grid having a plurality of resource elements of the communication system, according to an embodiment.

The proposed system uses Slotted ALOHA. This may involve a synchronization of all mobile stations wrt. some kind of framing structure in time and frequency. FIG. 4 shows a possible framing structure 102.

In detail, FIG. 4 shows a schematic view of a resource grid 102 having a plurality of resource elements 104. The ordinate describes the frequency and the abscissa the time.

As shown in FIG. 4, the resources for the uplink data can be divided into so-called "resource elements", which may have a specific allocation in time and frequency. Furthermore, the physical resources of each resource element (e.g. bandwidth, duration) can be identical, so that multiple resource elements 104 form a resource grid 102, e.g., in the time and frequency axis. However, such grid 102 could also be extended to other dimensions, e.g., by applying code-division multiple access by using orthogonal or non-orthogonal codes.

Examples for the grid shown in FIG. 4 are e.g. OFDM (Orthogonal Frequency-Division Multiplexing) symbols, where the frequency axis are the OFDM subcarriers, and the time axis are the different OFDM symbols. Furthermore, the SC-FDMA (Single-Carrier Frequency Division Multiple Access) based uplink scheme used in the 3GPP standard family also may form such an uplink resource grid.

In other words, FIG. 4 shows a principle of framing structure with resource grid, the sync word and/or the downlink data may also be transmitted on a different frequency, e.g. in case of FDD (Frequency Division Duplexing), the smallest number of resources that can be occupied is a resource element 104.

It is beneficial when the mobile stations 128 have a precise synchronization to the uplink resource grid 102. E.g. in case of OFDM this would reduce the effects of adjacent channel interference (ACI) and multiple-access interference (MAI). In order to compensate for propagation delays, the mobile stations 128 may also use schemes such as timing advance, i.e. the devices transmit the data earlier than the start time of a resource element 104 in order to compensate for their individual propagation delay. Thus, the uplink data of all devices is perfectly aligned to the uplink resource grid.

The mobile stations 128 can be configured to synchronize itself to a synchronization signal of the mobile communication system 126 or another communication system.

The mobile stations 128 can use a specific synchronization signal transmitted by the base station 130 to synchronize themselves on the uplink resource grid. In case of state-of-the-art 3GPP standards (e.g. Release 12) this could be the synchronization signals of the base stations (e.g. primary and secondary synchronization signals, or pilot signals). In addition, the mobile stations 128 may also use payload data transmitted by the base station 130 (also data for other mobile stations) to synchronize themselves onto the base station 130. Examples are e.g. the cyclic prefix of the OFDM symbols in the downlink of state-of-the art 3GPP downlink signals. If a base station 130 is present and TDD (time division duplex) is used for the communication of the mobile stations 128 with the base stations 130, some resources may be used for providing this synchronization signal in addition to downlink data. An example is the TDD (Time Division Duplexing) mode of state-of-the-art 3GPP standards.

The synchronization of the mobile devices 128 does not require the transmission of any data to the base-station 130. Therefore, the mobile devices 128 may just listen to the signals of base stations 130 to synchronize themselves. Furthermore, the mobile devices 128 can also use signals from other mobile devices to synchronize themselves. Furthermore, the mobile devices 128 can also use any kind of other signals (e.g. navigation systems (GPS, Galileo), digital TV (DVB-T), or digital radio (DAB)) that have not been transmitted for the purpose of synchronization, so-called signals of opportunity, to synchronize themselves on the resource grid. This is especially useful if no base station 130 is present or the base station signal cannot be received.

Resource Allocation For Slotted Aloha Resources

Multi System Frequency Usage

The transmitters 100 (e.g., mobile devices 128) can be configured to transmit the plurality of data packets 108 of the additional telegram 106 in resource elements 104 reserved for non-standard compliant communication. The resource elements 104 reserved for non-standard compliant communication can be a proper subset of uplink resource elements used for communication from mobile stations 128 to base stations 130 of the mobile communication system 126. The resource elements are associated with at least one out of specific time slots and specific frequencies In case of state-of-the-art 3GPP standards the resource grid 102 applies to the uplink resources. Consequently, it is beneficial in this case to transmit all transmit data of the mobile stations 128 in the uplink resources. The uplink resources may be specific frequencies (in case of FDD=frequency division duplex) or specific time periods (in case of TDD=time division duplex). The 3GPP base station 130 may then allocate specific resource elements, e.g. time- and/or frequency resources, within the uplink resources for the slotted ALOHA access. The other resources may be used for classical communication as defined in the current 3GPP specifications.

Pre-Allocated Resources

In modern managed communication systems (e.g. 3GPP standard) a user may have to request recourses. Instead of this dynamic allocation for each user some resources of the resource grid may be allocated for slotted ALOHA. In a scenario of M2M communication a lot of small messages has to be transmitted. Without the resource allocation procedure a lot of traffic and energy in the device is saved. Another advantage is the short delay of these messages. In D2D communication (e.g. Car 2 Car) it is very important to guarantee a short delay of signalling an event to other devices.

Dynamic Resource Allocation

The allocation of resources 104 of the resource grid 102 may be either static or variable. A static configuration may be especially beneficial in systems 126 without a managing entity, e.g. if no base station 130 is present. In these systems 126 a certain amount of resources can be allocated for the communication.

Resource elements 104 reserved for non-standard compliant communication can be allocated by a managing entity (e.g., base station) of the mobile communication system. Further, resources elements 104 reserved for non-standard compliant communication can be allocated dynamically by the managing entity of the mobile communication system in dependence on performance criteria.

In systems with a managing entity the resources for the slotted ALOHA access may change over time. (A managing entity may be a base station 130 or a mobile station acting as a managing entity.) The number of resources in the resource grid 102 that may be used by a mobile station 128 in the slotted ALOHA may be adjusted to the resources that may be used in order to achieve a certain performance criteria. Such criteria may be the average number of mobile devices 128 transmitting in a resource element, the overall system latency, the packet loss rate, or any other suitable metric. This ensures an optimal usage of resources in the given scenario.

Depending on the resources that may be used for fulfilling specific performance criteria the base station 130 may vary the resources assigned to slotted ALOHA over time. The position of the available resource elements 104 may be signaled to the mobile stations 128 using some kind of signaling signals transmitted by the base station 130 (typically in the downlink resources) or the managing entity mobile station.

Resource Positions For Slotted ALOHA Change Over Time

Figure 5:
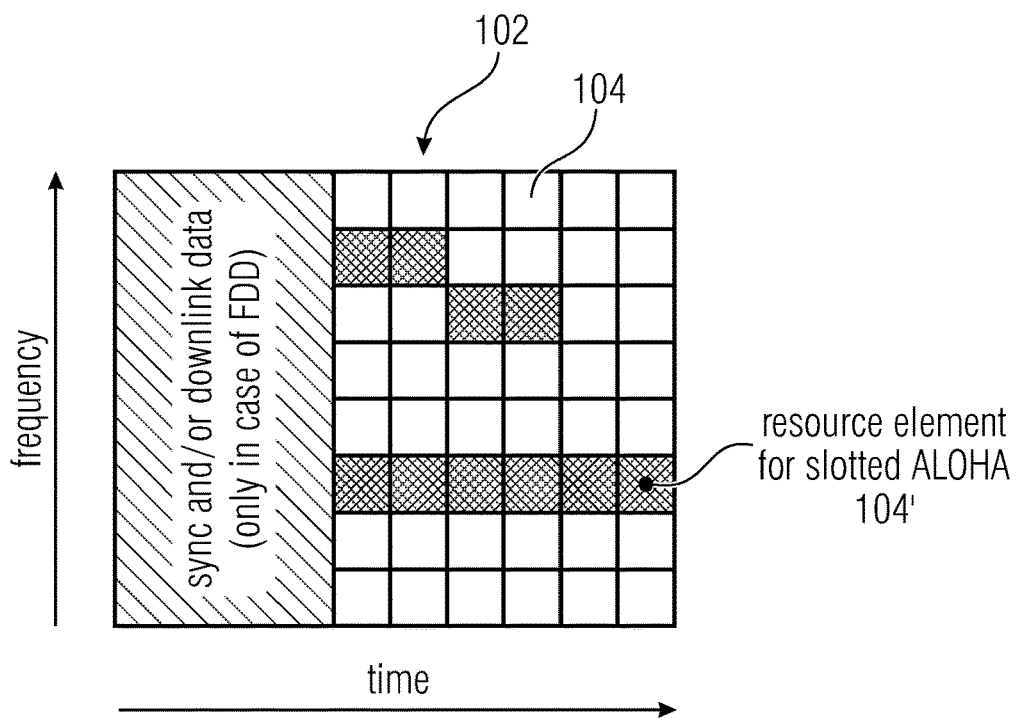
FIG. 5 shows a schematic view of a resource grid having a plurality of resource elements, wherein some of the resource elements are reserved for non-standard compliant communication, according to an embodiment of the present invention.
Figure 6:
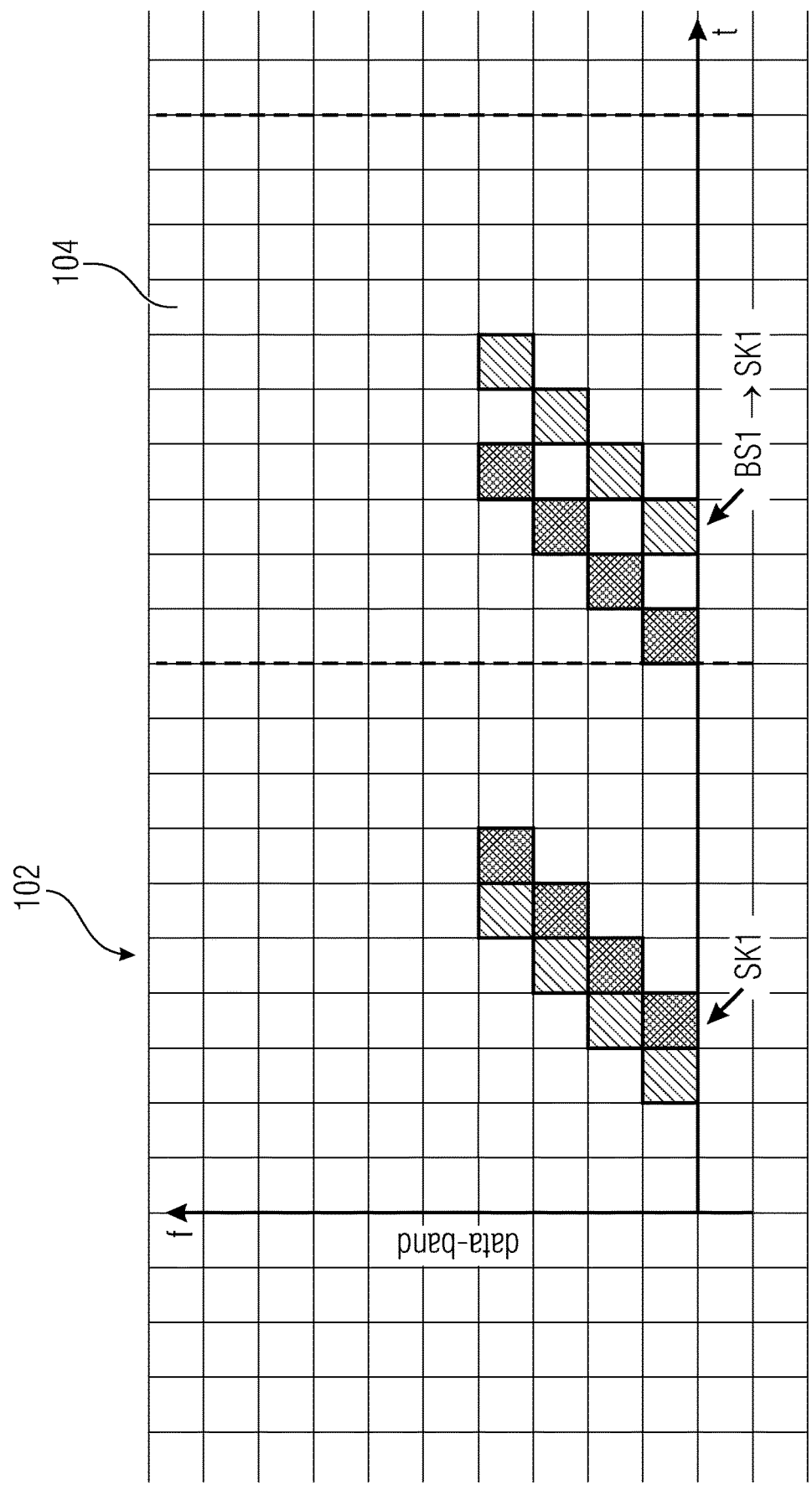
FIG. 6 shows a schematic view of a resource grid having a plurality of resource elements and different user sequences used for transmitting, according to an embodiment.

FIG. 5 shows a schematic view of a resource grid 102 having a plurality of resource elements 104, wherein some of the resource elements 104' are reserved for non-standard compliant communication. The ordinate describes the frequency and the abscissa the time.

The resource elements 104' allocated for slotted ALOHA may be fixed on specific frequencies (resources allocated at bottom of FIG. 5) or their position may change over time (resources allocated at top of FIG. 5). Changing positions are especially beneficial in case of fading channels, as varying frequencies lead to improved diversity. Furthermore, it is also possible to allocate resources only during specific times. If OFDM is used, not all OFDM symbols would carry resource elements for slotted ALOHA. The pattern of available time slots, e.g. OFDM symbols, may change over time. The same also applies for SC-FDMA as used in the uplink of 3GPP. Similar schemes can also be applied in case of other schemes providing resource elements, e.g. in case of code-division multiple access using, e.g. orthogonal codes.

As shown in FIG. 5, resource elements 104' allocated for slotted ALOHA access may change over time, and only a subset of the resources may be allocated for this communication type.

Double Usage of Resources

Some of the resource elements 104 can be allocated for both non-standard compliant communication and standard compliant communication.

In systems such as 3GPP resource elements 104 may be allocated for slotted ALOHA, even if they are also used for classical communication. In this case there is a certain probability of collision between slotted ALOHA data and normal data, which may be acceptable in certain applications. An example is when very low slotted ALOHA traffic is expected. Assigning specific resource elements purely for slotted ALOHA would mean a too high overhead in such cases, while the number of collisions between slotted ALOHA and normal data may be on an acceptable level.

Using "White Spaces" to Transmit Fragments

The transmitters 100 (e.g., mobile stations 128) can be configured to transmit at least one of the plurality of data packets in a guard resource element, e.g. a guard resource band or frequency, or a guard interval or time slot.

In the resource grid 102 of state-of-the-art 3GPP standards (e.g. LTE (Long Term Evolution)), there are typically some unused spaces, or spaces with a minor performance degradation if an interfere is on this resource slot (e.g. guard bands or guard intervals). This resources could be used to transmit slotted ALOHA messages. This technique would increase the data rate of the two combined systems.

Resource Utilisation For Slotted Aloha Packets

Slotted ALOHA and Telegram Splitting

In a typical configuration, the available physical resources in each resource element are not sufficient to carry a complete data packet. The motivation for such a configuration could be to realize telegram splitting as described in [2]. Thus, in a typical configuration each data packet will be divided into multiple fragments. Each fragment is then transmitted in one resource element assigned for Slotted ALOHA access. A possible realization of this concept is similar to the Telegram Splitting as presented in [Kilian, G., et al.; Improved coverage for low-power telemetry systems using telegram splitting, Proceedings of 2013 European Conference on Smart Objects, Systems and Technologies (SmartSysTech), 2013], except that slotted ALOHA is used instead of pure ALOHA.

Overlap Recovery Due to FEC

The transmitters 100 (e.g., mobile stations 128) can be configured to channel encode the plurality of data packets 108 such that only a part of the plurality of data packets 108 may be used for decoding the additional telegram 106.

In a typical configuration, the data packets 108 will be protected using forward error correction (FEC). This improves the performance in case of noise. Furthermore, if one or more fragments of multiple fragments are lost due to collisions (e.g. with other mobile stations using slotted ALOHA, or any other interferer) there is a high probability that the interfered fragments can be recovered in the receiver by means of the FEC and possibly successive interference cancellation. Such collisions occur e.g. if the base station 130 or mobile station 3 128_3 (see FIG. 3) want to receive data from mobile station 1 128_1 and/or mobile station 2 128_2. A receiver in this sense may be the base station or any mobile station.

User Sequences to Minimize Collisions

The transmitter 100 (e.g., mobile station 128) can be configured to transmit the plurality of data packets 108 in selected resource elements selected out of the resource elements based on user sequences in order to reduce collisions.

In a simple configuration the fragments are transmitted on the next available resource elements, e.g., on the same frequency slot, assigned for slotted ALOHA. This means that slotted ALOHA resources are occupied over a complete time interval. In an advanced configuration the resulting fragments are transmitted on the slotted ALOHA resource elements using specific user sequences. Examples for these user sequences have e.g. been proposed by Massey in [Massey, J. & Mathys, P.; The collision channel without feedback Information Theory, IEEE Transactions on, 1985, 31, 192-204]. In this case, the transmitting mobile station can leave out some Slotted ALOHA resources. This concept increases the probability that the fragments of multiple mobile stations do not fully overlap. The interfered fragments can then be recovered by the FEC. This concept is especially interesting for the cases where the receiver of the slotted ALOHA fragments is able to detect collisions, i.e. two or more mobile stations transmit data in the same resource element. This then corresponds to erasure decoding, which delivers optimum performance.

Different Start Times in BS—Frame

Typically, the data flow is organized in frames. If there are multiple resource blocks available in one frame, it is possible to start the slotted ALOHA user sequence on different time slots. Therefore, the probability of interfering another message is reduced and the quality of service is increased.

FIG. 5 shows a schematic view of a resource grid 102 having a plurality of resource elements and different user sequences used for transmitting.

Successive Interference Cancellation and Mimo Processing

As already mentioned, the plurality of data packets 108 can be channel encoded such that only a part of the plurality of data packets may be used for decoding the additional telegram. The receiver 120 (e.g., base station 130) can be configured reconstruct an original version of the collided channel encoded data packet based on the decoded additional telegram and to subtract the original version of the collided channel encoded data packet from the data received in the resource element in order to obtain the other data packet, when one of the channel encoded data packets collides with another data packet in one of the resource elements.

In other words, above an example of time and non-time critical data packets were described. Due to the used access scheme only 50% of the fragments of the time critical stream are interfered. However, it should be possible to recover the data using the FEC, and thus, the data in the interfered resource elements is known. Consequently, this re-encoded data can be subtracted from the interfered resource elements. And then, the non-time critical service can be decoded. This principle is called successive interference cancellation (SIC).

SIC with Optimized User Sequences and Transmit Power

The SIC principle can work even better using further optimized user sequences. It is also possible to adapt additional parameters, e.g. the transmit power of the mobile station, to further improve the performance of SIC.

The use of SIC can be further extended with multi-user (MU) single-in-multiple-out (SIMO) (or multiple-in-multiple-out—MIMO) processing. Using MU-SIMO/MIMO, the receiver can use techniques such as receiver-side beamforming to separate the interfering signals of multiple transmitting mobile stations.

SIC and MIMO (Beamforming)

Generally, the use of SIC and MU-SIMO/MIMO is especially useful when using maximum likelihood (ML) decoding or other schemes close to the theoretical performance. Furthermore, there may exist special wave-forms that are more suitable for SIC and MU-SIMO/MIMO. Examples are wave-forms that can be generated with high linearity in the transmitter power amplifier, i.e. that cause only little non-linear distortions. This is due to the reason that the receiver has to subtract the wave-form in case of SIC. If the wave-form is not generated with high linearity, this causes noise like components that cannot be estimated by the receiver.

Thus, the receiver is not able to fully subtract the signal of the corresponding mobile stations. The remaining noise level then reduces the performance in the following decoding stages.

Furthermore, the use of MU-SIMO/MIMO and SIC is not limited to two signals colliding in a resource element. Depending on the received signal quality and the thermal noise level, an arbitrary number of signals may be decoding using MU-SIMO/MIMO and SIC.

Further Embodiments

Figure 7:
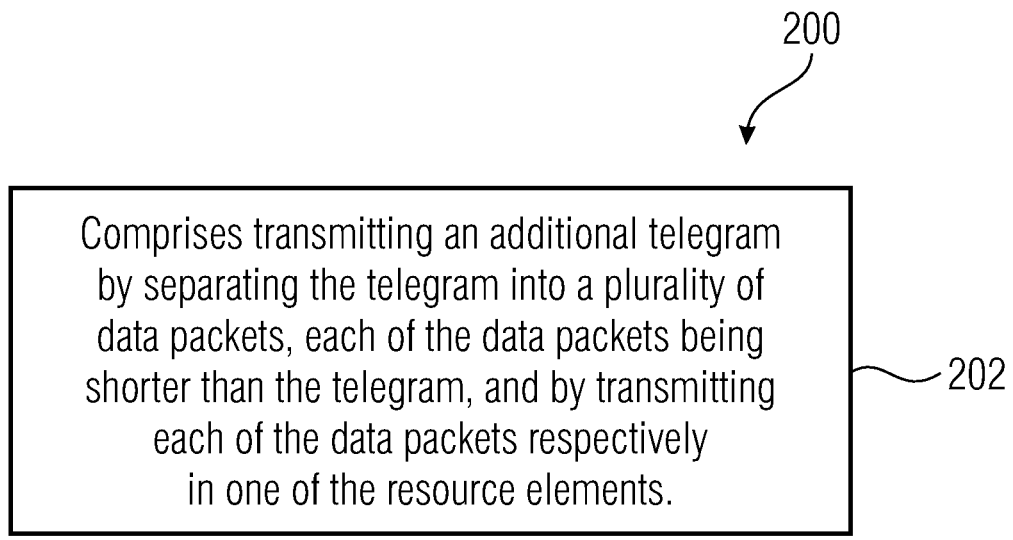
FIG. 7 shows a flow-chart of a method for transmitting, according to an embodiment of the present invention.

FIG. 7 shows a flow-chart of a method 200 for transmitting in a mobile communication system according to a mobile communication standard. Resources of the communication system are divided into resources elements. The method comprises transmitting 202 an additional telegram by separating the telegram into a plurality of data packets, each of the data packets being shorter than the telegram, and by transmitting each of the data packets respectively in one of the resource elements.

Figure 8:
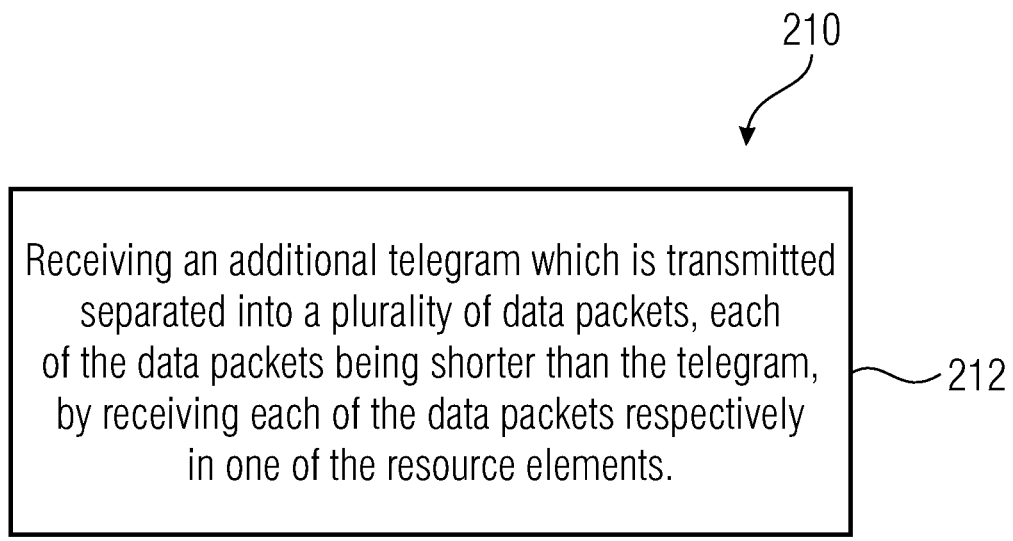
FIG. 8 shows a flow-chart of a method for receiving, according to an embodiment of the present invention.

FIG. 8 shows a flow chart of a method 210 for receiving in a mobile communication system according to a mobile communication standard. Resources of the communication system are divided into resources elements. The method comprises receiving 212 an additional telegram which is transmitted separated into a plurality of data packets, each of the data packets being shorter than the telegram, by receiving each of the data packets respectively in one of the resource elements.

In embodiments, the plurality of data packets of the additional telegram can be transmitted (e.g., over a communication channel) with a temporal distance between the data packets.

Embodiments provide a new approach to improve the performance of future M2M communication systems using telegram splitting with slotted ALOHA. The base station of the network assigns specific time and frequency slots to the devices than can simply transmit their data within these slots. If a device wants to transmit data, it just selects one or multiple slots and starts transmission. A prior listening whether specific slots are free is not required. Thus, collisions on the uplink resources occur. These collisions can be resolved in most cases by means of signal processing (e.g., successive interference cancellation) and specific telegram splitting access patterns.

Embodiments are not limited to any kind of cellular standards. It could also be used in any kind of transmission standard.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. Transmitter, configured to operate in a mobile communication system according to a mobile communication standard, wherein resources of the mobile communication system are divided into resources elements;
   wherein the transmitter is configured to transmit a standard compliant telegram;
   wherein the transmitter is configured to transmit an additional telegram additional to the standard compliant telegram , wherein the transmitter is configured to transmit the additional telegram using telegram splitting, wherein in telegram splitting the additional telegram is separated into a plurality of data packets, each of the plurality of data packets being shorter than the additional telegram, and wherein the transmitter is configured to transmit each of the plurality of data packets respectively in one of the resource elements;
   wherein the transmitter is configured to transmit the plurality of data packets of the additional telegram in resource elements reserved for non-standard compliant communication;
   wherein the transmitter is configured to select the resource elements for transmitting the plurality of data packets out of the resource elements reserved for non-standard compliant communication, and to start transmission of the plurality of data packets in the selected resource elements without prior listening whether these resource elements are free; and
   wherein the plurality of data packets are channel encoded such that only a part of the plurality of data packets are required for decoding the additional telegram.

2. Transmitter according to claim 1, wherein the transmitter is configured to perform standard compliant communication using resource elements reserved for standard compliant communication.

3. Transmitter according to claim 1, wherein the transmitter is configured to synchronize itself to a synchronization signal of the mobile communication system or another communication system.

4. Transmitter according to claim 1, wherein the resource elements reserved for non-standard compliant communication are a proper subset of uplink resource elements used for communication from mobile stations to base stations of the mobile communication system.

5. Transmitter according to claim 1, wherein the resource elements are associated with at least one out of specific time slots and specific frequencies.

6. Transmitter according to claim 1, wherein the resources elements reserved for non-standard compliant communication are allocated by a managing entity of the mobile communication system.

7. Transmitter according to claim 1, wherein the resources elements reserved for non-standard compliant communication are allocated dynamically by the managing entity of the mobile communication system in dependence on performance criteria.

8. Transmitter according to claim 1, wherein some of the resource elements are allocated for both non-standard compliant communication and standard compliant communication.

9. Transmitter according to claim 1, wherein the transmitter is configured to transmit at least one of the plurality of data packets in a guard resource element.

10. Transmitter according to claim 1, wherein the transmitter is configured to not transmit or to transmit later one of the plurality of data packets if a transmission of the data packet will lead to a collision with another data packet transmitted by another transmitter of the mobile communication system.

11. Transmitter according to claim 1, wherein the transmitter is configured to transmit the plurality of data packets in selected resource elements selected out of the resource elements based on user sequences in order to reduce collisions.

12. Receiver, configured to operate in a mobile communication system according to a mobile communication standard, wherein resources of the mobile communication system are divided into resources elements;
   wherein the receiver is configured to receive a standard compliant telegram;
   wherein the receiver is configured to receive an additional telegram additional to the standard compliant telegram, wherein the additional telegram is transmitted using telegram splitting, wherein in telegram splitting the additional telegram is transmitted separated into a plurality of data packets, each of the plurality of data packets being shorter than the additional telegram, wherein the receiver is configured to receive each of the plurality of data packets respectively in one of the resource elements;
   wherein the receiver is configured to receive the plurality of data packets of the additional telegram in resource elements reserved for non-standard compliant communication;
   wherein the receiver is configured to receive the plurality of data packets in resource elements selected by a transmitter out of the resource elements reserved for non-standard compliant communication; and
   wherein the plurality of data packets are channel encoded such that only a part of the plurality of data packets are required for decoding the additional telegram.

13. Receiver according to claim 12, wherein the plurality of data packets are channel encoded such that only a part of the plurality of data packets may be used for decoding the additional telegram;
   wherein, when one of the channel encoded data packets collides with another data packet in one of the resource elements, the receiver is configured reconstruct an original version of the collided channel encoded data packet based on the decoded additional telegram and to subtract the original version of the collided channel encoded data packet from the data received in the resource element in order to acquire the other data packet.

14. System, comprising:
   a transmitter, configured to operate in a mobile communication system according to a mobile communication standard, wherein resources of the mobile communication system are divided into resources elements;

wherein the transmitter is configured to transmit a standard compliant telegram;

wherein the transmitter is configured to transmit an additional telegram additional to the standard compliant telegram, wherein the transmitter is configured to transmit the additional telegram using telegram splitting, wherein in telegram splitting the additional telegram is separated into a plurality of data packets, each of the plurality of data packets being shorter than the additional telegram, and wherein the transmitter is configured to transmit each of the plurality of data packets respectively in one of the resource elements;

wherein the transmitter is configured to transmit the plurality of data packets of the additional telegram in resource elements reserved for non-standard compliant communication;

wherein the transmitter is configured to select the resource elements for transmitting the plurality of data packets out of the resource elements reserved for non-standard compliant communication, and to start transmission of the plurality of data packets in the selected resource elements without prior listening whether these resource elements are free; and a receiver, configured to operate in a mobile communication system according to a mobile communication standard, wherein resources of the mobile communication system are divided into resources elements;

wherein the transmitter is configured to receive a standard compliant telegram;

wherein the receiver is configured to receive an additional telegram additional to the standard compliant telegram, wherein the additional telegram is transmitted using telegram splitting, wherein in telegram splitting the additional telegram is transmitted separated into a plurality of plurality of data packets, each of the plurality of data packets being shorter than the additional telegram, wherein the receiver is configured to receive each of the plurality of data packets respectively in one of the resource elements;

wherein the receiver is configured to receive the plurality of data packets of the additional telegram in resource elements reserved for non- standard compliant communication;

wherein the receiver is configured to receive the plurality of data packets in resource elements selected by a transmitter out of the resource elements reserved for non-standard compliant communication; and wherein the plurality of data packets are channel encoded such that only a part of the plurality of data packets are required for decoding the additional telegram.

15. Method for transmitting in a mobile communication system according to a mobile communication standard, wherein resources of the mobile communication system are divided into resources elements, wherein the method comprises:

transmitting a standard compliant telegram;

transmitting an additional telegram additional to the standard compliant telegram using telegram splitting, wherein in telegram splitting the additional telegram is separated into a plurality of data packets, each of the plurality of data packets being shorter than the additional telegram, and wherein each of the plurality of data packets are transmitted respectively in one of the resource elements;

wherein transmitting comprises transmitting the plurality of data packets of the additional telegram in resource elements reserved for non- standard compliant communication;

wherein transmitting comprises selecting the resource elements for transmitting the plurality of data packets out of the resource elements reserved for non-standard compliant communication;

wherein transmitting comprises starting transmission of the plurality of data packets in the selected resource elements without prior listening whether these resource elements are free; and wherein the plurality of data packets are channel encoded such that only a part of the plurality of data packets are required for decoding the additional telegram.

16. Method for receiving in a mobile communication system according to a mobile communication standard, wherein resources of the mobile communication system are divided into resources elements, wherein the method comprises:

receiving a standard compliant telegram;

receiving an additional telegram additional to the standard compliant telegram, wherein the additional telegram is transmitted using telegram splitting, wherein in telegram splitting the additional telegram is separated into a plurality of data packets, each of the plurality of data packets being shorter than the additional telegram, wherein each of the plurality of data packets are received respectively in one of the resource elements;

wherein receiving comprises receiving the plurality of data packets of the additional telegram in resource elements reserved for non-standard compliant communication;

wherein the receiving comprises receiving the plurality of data packets in resource elements selected by a transmitter out of the resource elements reserved for non-standard compliant communication; and wherein the plurality of data packets are channel encoded such that only a part of the plurality of data packets are required for decoding the additional telegram.

17. A non-transitory digital storage medium having a computer program stored thereon to perform the method for transmitting in a mobile communication system according to a mobile communication standard, wherein resources of the mobile communication system are divided into resources elements, said method comprising:

transmitting a standard compliant telegram;

transmitting an additional telegram additional to the standard compliant telegram using telegram splitting, wherein in telegram splitting the additional telegram is separated into a plurality of data packets, each of the plurality of data packets being shorter than the additional telegram, and wherein each of the plurality of data packets are transmitted respectively in one of the resource elements;

wherein transmitting comprises transmitting the plurality of data packets of the additional telegram in resource elements reserved for non-standard compliant communication;

wherein transmitting comprises selecting the resource elements for transmitting the plurality of data packets out of the resource elements reserved for non-standard compliant communication; and wherein transmitting comprises starting transmission of the plurality of data packets in the selected resource elements without prior listening whether these resource elements are free, wherein the plurality of data packets are channel encoded such that only a part of the plurality of data packets are required for decoding the additional telegram,
when said computer program is run by a computer.

18. A non-transitory digital storage medium having a computer program stored thereon to perform the method for receiving in a mobile communication system according to a mobile communication standard, wherein resources of the mobile communication system are divided into resources elements, said method comprising:
receiving a standard compliant telegram;
receiving an additional telegram additional to the standard compliant telegram, wherein the additional telegram is transmitted using telegram splitting, wherein in telegram splitting the additional telegram is separated into a plurality of data packets, each of the plurality of data packets being shorter than the additional telegram, wherein each of the plurality of data packets are received respectively in one of the resource elements;
wherein receiving comprises receiving the plurality of data packets of the additional telegram in resource elements reserved for non-standard compliant communication; and
wherein the receiving comprises receiving the plurality of data packets in resource elements selected by a transmitter out of the resource elements reserved for non-standard compliant communication,
wherein the plurality of data packets are channel encoded such that only a part of the plurality of data packets are required for decoding the additional telegram,
when said computer program is run by a computer.

* * * * *